United States Patent [19]
Breitbach

[11] 3,770,143
[45] Nov. 6, 1973

[54] APPARATUS FOR TRANSFERRING TRAYS BETWEEN A CONVEYOR SYSTEM AND A STACK

[76] Inventor: Johnnie J. Breitbach, Normal, Ill.

[22] Filed: Nov. 4, 1971

[21] Appl. No.: 195,627

[52] U.S. Cl.......... 214/6 DS, 214/8.5 A, 214/8.5 D, 271/18 A, 271/63 A, 198/35
[51] Int. Cl............................................. B65g 60/00
[58] Field of Search.................. 271/18 A, 63 A, 74, 271/68, 64; 214/6 DS, 6 FS, 6 BA, 8.5 A, 8.5 C, 8.5 D, 8.5 R, 6 DK, 6 H; 198/35

[56] References Cited
UNITED STATES PATENTS

| | | | |
|---|---|---|---|
| 3,224,757 | 12/1965 | Parke et al......................... | 271/18 A |
| 2,960,242 | 11/1960 | Herr et al. ......................... | 214/6 DS |
| 2,015,809 | 10/1935 | Moore ............................... | 214/6 DS |
| 3,342,350 | 9/1967 | Seragnoli...................... | 214/6 BA X |
| 3,122,229 | 2/1964 | Engleson et al. .............. | 214/6 BA X |
| 3,517,835 | 6/1970 | Temple............................. | 214/8.5 D |
| 2,766,043 | 10/1956 | Buccicone ........................ | 271/18 A |
| 3,404,789 | 10/1968 | Georgeff et al.................. | 214/8.5 D |
| 3,409,149 | 11/1968 | Graux............................... | 271/18 A |

FOREIGN PATENTS OR APPLICATIONS

| | | | |
|---|---|---|---|
| 1,546,148 | 10/1968 | France.............................. | 214/6 DS |
| 266,809 | 9/1964 | Australia........................... | 214/6 DS |

Primary Examiner—Robert J. Spar
Attorney—Vernon J. Pillote

[57] ABSTRACT

An apparatus for transferring baking trays and the like of ferromagnetic material between a tray conveyor system and a stack wherein an elevated tray conveyor system supports and advances articles laterally of a stack elevator which is operative to position the stack with the top tray at a level adjacent the tray conveyor, an endless type magnetic overhead conveyor overlies the elevator and the tray conveyor, and a tray transfer mechanism is provided for transferring trays between the overhead conveyor and the stack. The apparatus can be arranged to effect either a tray stacking or a tray unstacking operation.

19 Claims, 13 Drawing Figures

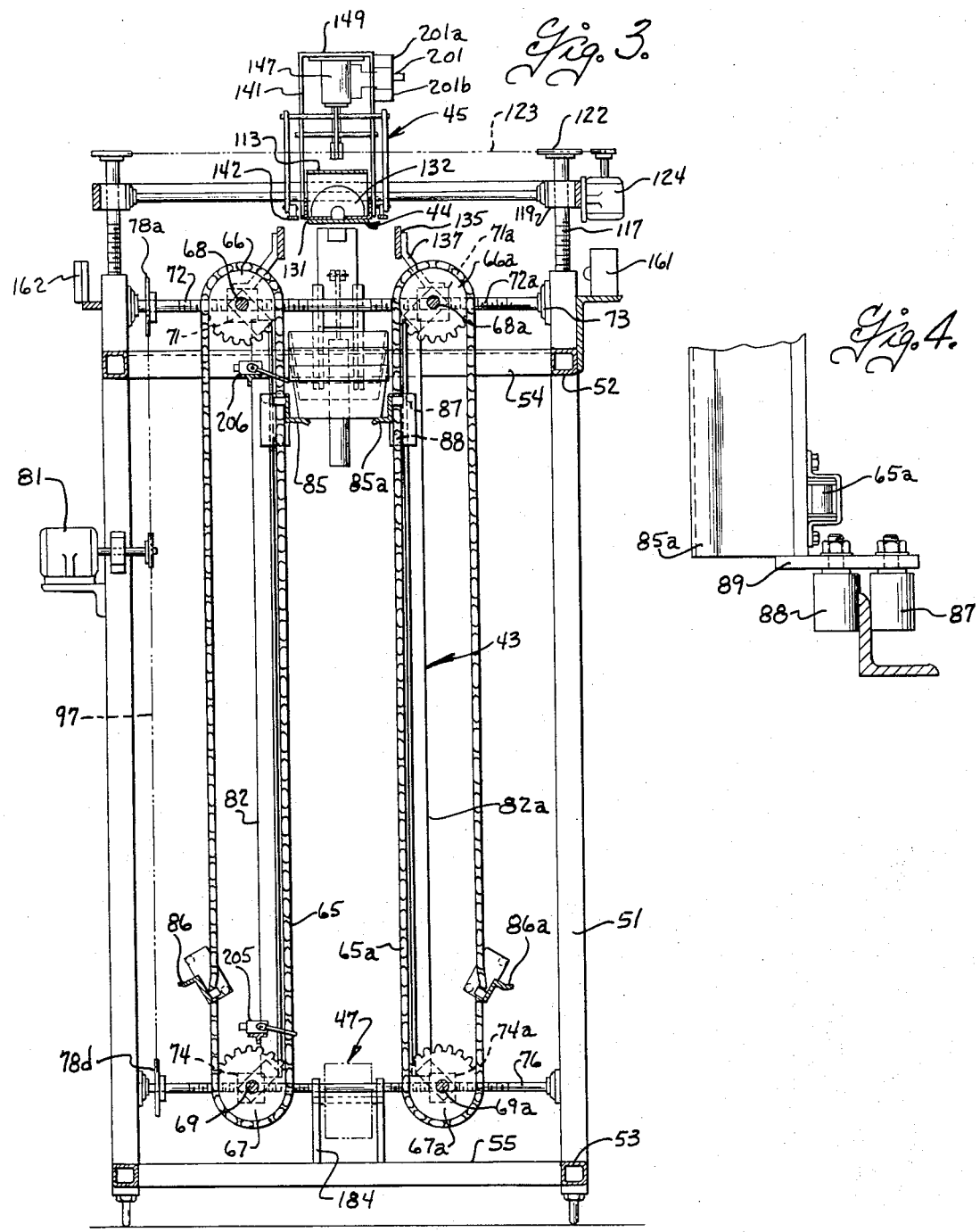

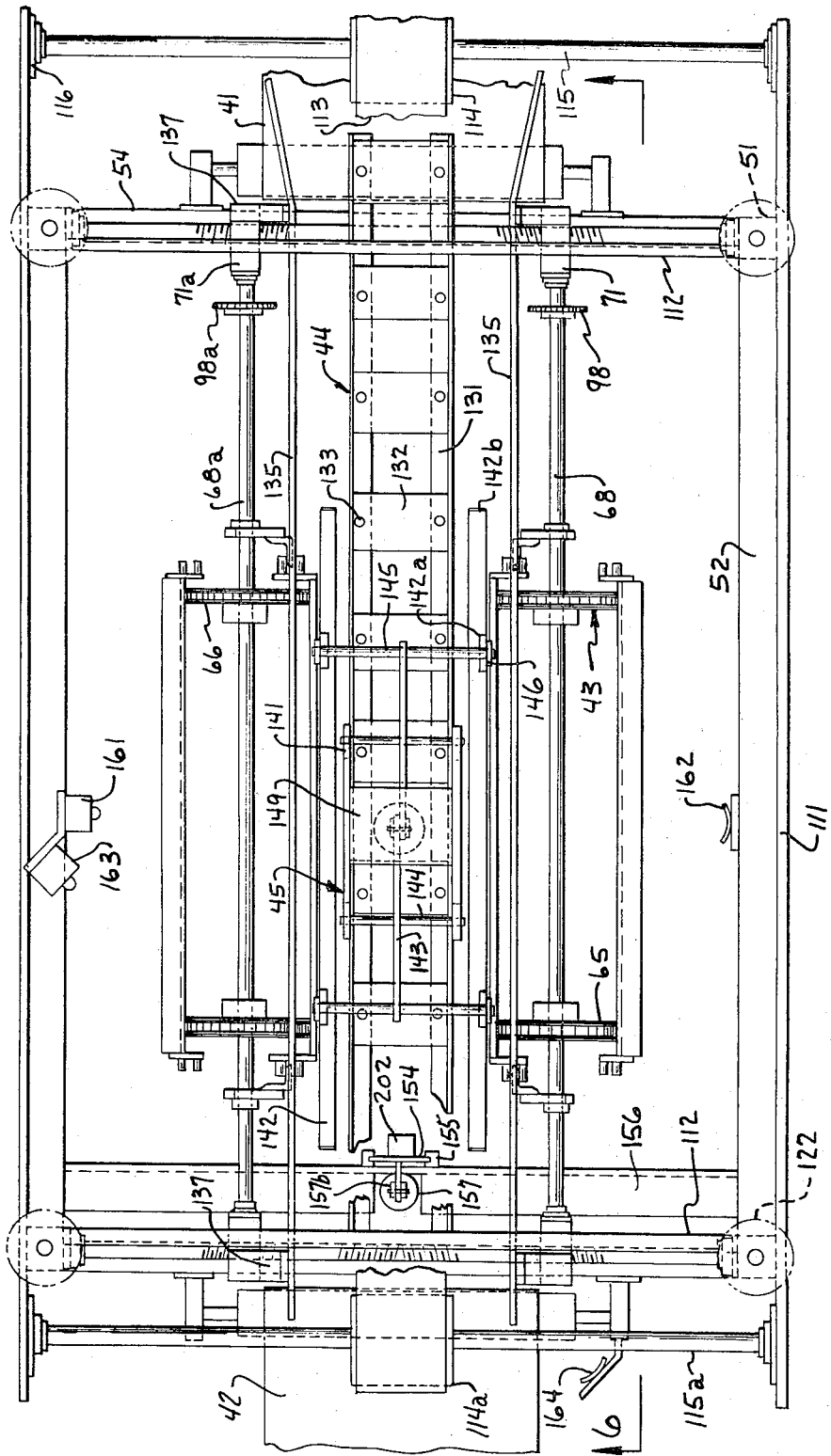

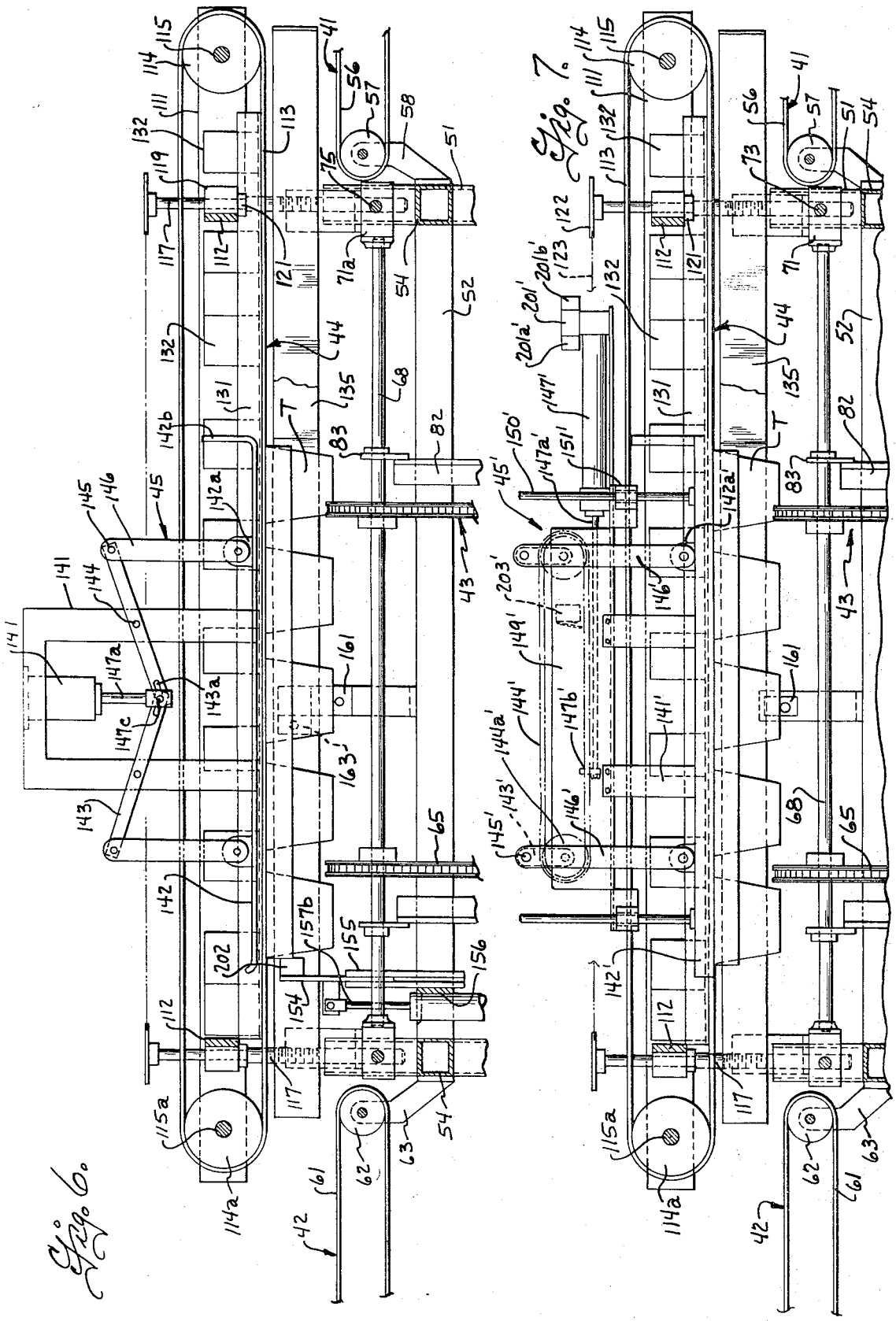

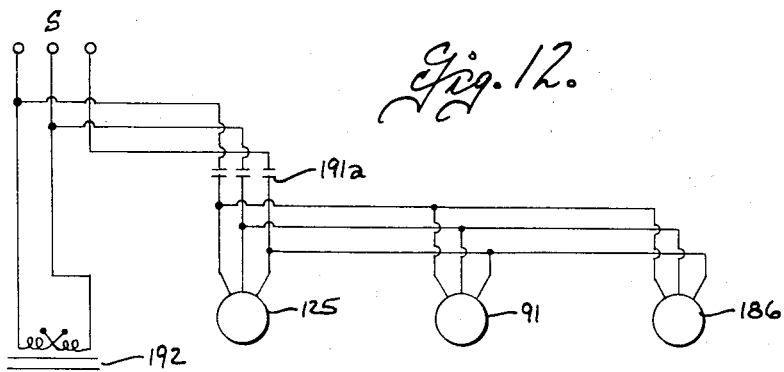
Fig. 12.
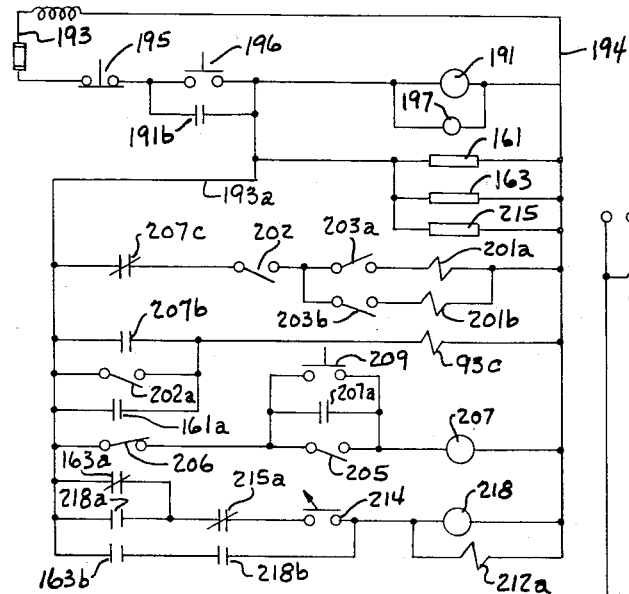
Fig. 13.
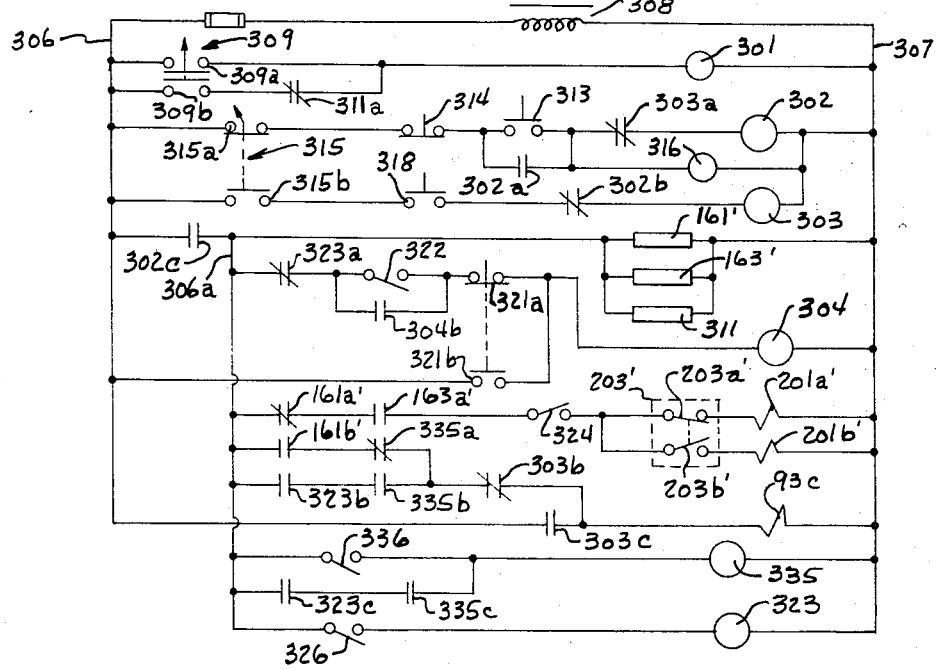

3,770,143

APPARATUS FOR TRANSFERRING TRAYS BETWEEN A CONVEYOR SYSTEM AND A STACK

BACKGROUND OF THE INVENTION

Many bread bakeries utilize a conveyor system for transporting the baking pans from the panner or dough depositing station through the oven and then from the oven to the depanner or bakery removal station. In a baking operation, a large number of baking pans are required to "fill" the conveyor system which transports the pans from the panner through the ovens and to the depanner and, in large baking runs which exceed the capacity of the pans necessary to fill the conveyor system, it is desirable to recirculate the pans from the depanner back to the panner. When starting a baking operation or when changing from one baking operation to another utilizing different size or shape pans, it is necessary to remove one set of pans from the system and introduce a different set of pans into the system. In addition, it is sometimes necessary, as when a back-up of pans occurs somewhere in the baking system, to remove pans from the conveyor system until the cause of the back-up of pans has been corrected.

It has heretofore been proposed as shown in the U.S. Pat. to Henry A. Heid No. 3,533,517, dated Oct. 13, 1970, to provide a pan stacking apparatus for removing pans from the pan conveyor system. In that apparatus, the pans from the pan infeed conveyor first drop down onto a pair of laterally spaced pan supports positioned above an elevator, and the pan supports are thereafter moved laterally apart to allow the pan to drop from the pan supports onto the top of the stack on the stack elevator. This two-step arrangement, wherein the pans first drop onto lateral pan supports and are thereafter dropped from the pan supports onto the stack, increases the overall cycle time required to transfer pans from the infeed conveyor to the stack. Further, the overall drop of the pans between the pan conveyor and the stack in such a two-step arrangement is relatively high and this increases the likelihood of damage to the pans during stacking. Moreover, this prior arrangement is such as to require a separate by-pass conveyor and gating arrangement for bypassing the pans around the stacker, in the event it is desired to recirculate the pans in the pan conveyor system past the stacker.

The pan stacking apparatus described above could not be utilized as an unstacking apparatus to feed pans into the pan conveyor system, and it has heretofore been proposed, for example as shown in the U.S. Pat. to Heide et al. No. 3,521,768, dated July 28, 1970, to provide a pan unstacking apparatus in which each stack of pans is moved from an upright position onto an inclined stack feed conveyor, and the pans are then removed from the upper end of the inclined stack by upper and lower pan discharge conveyors whcih engage the top pan in the stack. The time required for tilting each upright stack onto the inclined stack conveyor without disrupting the stack, seriously limited the speed at which successive stacks of pans could be dispensed.

SUMMARY OF THE INVENTION

The present invention relates to an apparatus for transferring baking trays and the like of ferromagnetic material between a tray conveyor system and a stack. The tray conveyor extends laterally from a vertical stack elevator to underlie and support the trays at a preselected level, and the stack elevator has a drive mechanism operative to maintain the top tray in the stack at a level adjacent the level of the tray conveyor. An endless type overhead conveyor has its lower run spaced above the stack on the stack elevator and above the tray conveyor and has magnetic means cooperable with the lower run for magnetically holding a tray against the lower run of the overhead conveyor for movement therewith and a stack transfer means is provided for transferring the trays directly between the overhead conveyor and the stack. It is frequently desirable, for example in long baking runs, to recirculate the baking trays in the tray conveyor system for rerun through a baking cycle and the magnetic overhead conveyor is accordingly advantageously arranged to span the inlet and outlet tray conveyor sections at relatively opposite sides of the stack elevator so that it can also operate to transfer trays from the inlet tray conveyor section to the outlet tray conveyor section for recirculating the trays in the system.

In one aspect of the invention, the apparatus can be used to stack the baking trays and the tray transfer means includes a tray ejector operable when a tray is moved along the magnetic overhead conveyor to a position over the stack, for ejecting the tray from the overhead conveyor onto the stack. In order to enable selective recirculating of the trays from the inlet conveyor to an outlet conveyor, a movable stop is provided and is selectively movable between an operative position stopping baking trays in a position over the elevator and an inoperative position out of the path of movement of the trays to allow bypassing of the trays from the inlet to the outlet tray conveyor.

In another aspect of the invention, the apparatus can be utilized as an unstacker to feed trays from a stack to the conveyor system. In such apparatus, the tray transfer mechanism includes a magnetic means engageable with the trays for picking up a tray from the top of the stack and for elevating the tray to the underside of the overhead conveyor for movement therewith.

An important object of this invention is to provide an apparatus for transferring baking trays and the like between a tray conveyor system and a stack which minimizes the overall cycle time required to transfer a tray between the tray conveyor and the stack and which minimizes damage to the tray during transfer between the tray conveyor and the stack.

Another object of this invention is to provide an apparatus for transferring baking trays and the like between a tray conveyor system and a stack, which is arranged to enable selective bypassing of the trays in the tray conveyor system past the stack.

Still another object of this invention is to provide an apparatus for transferring baking trays and the like between a tray conveyor system and a stack which can be arranged for operation as a tray stacking apparatus and a tray unstacking apparatus.

These, together with other features and advantages of this invention will be more readily understood by reference to the following description when taken in connection with the accompanying drawings wherein:

FIG. 3 is a vertical sectional view taken on the plane 3—3 of FIG. 1;

FIG. 4 is a fragmentary sectional view taken on the plane 4—4 of FIG. 1 and showing a portion of the tray elevator;

FIG. 5 is a top plan view of the tray transfer apparatus;

FIG. 6 is a fragmentary vertical sectional view taken on the plane 6—6 of FIG. 5 and showing parts on a larger scale;

FIG. 7 is a fragmentary vertical sectional view showing a modified form of tray transfer apparatus for use in unstacking trays;

FIG. 12 is a schematic diagram of the electrical control circuit for a tray transfer apparatus for use in stacking trays; and FIG. 13 is a schematic diagram of the electrical control circuit for a tray transfer apparatus for use in unstacking trays.

Figure 8:
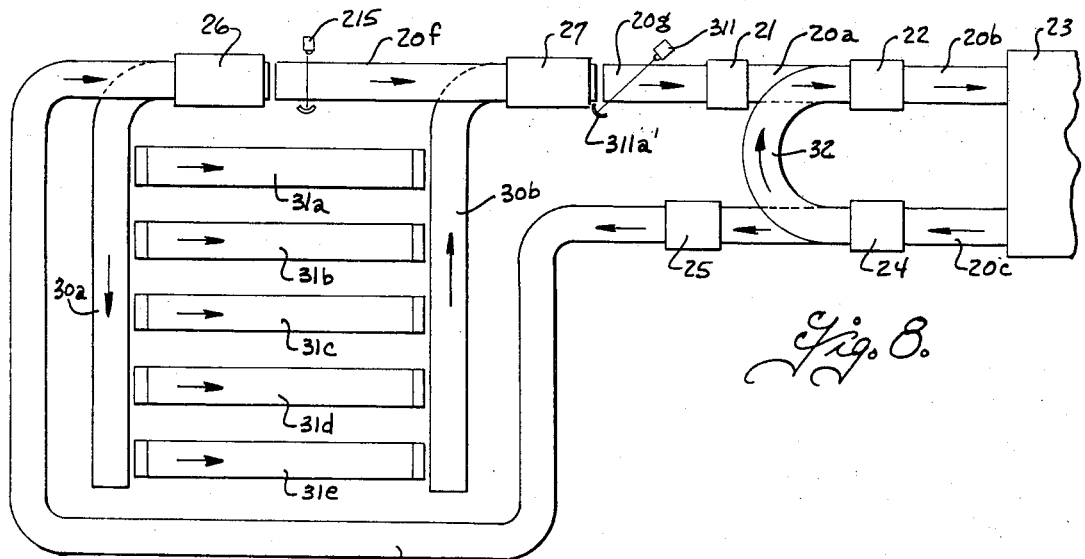
FIG. 8 is a schematic layout of a baking system employing the tray transfer apparatus of the present invention.

The apparatus of the present invention is generally adapted for use in tray conveyor systems used in bakeries and the like to transfer baking trays between the tray conveyor and a stack. The tray transfer apparatus can be arranged for stacking or unstacking baking pans of different size as well as baking pan lids and, as used herein, the term baking trays includes baking pans and lids. As diagrammatically shown in FIG. 8, the tray conveyor system includes a conveyor section 20a for conveying trays from a dough depositing station or panner 21 to a lid applying station or lidder 22, if lids are used, and a conveyor section 20b for conveying the trays from the lid applying station to an oven 23. The trays pass on conveyors through the oven and on a conveyor section 20c from the oven to a delidding apparatus 24 to remove the lids from the trays and a conveyor section 20d conveys the trays from the delidding apparatus to the bread removal apparatus or depanner 25. When starting a baking operation, it is necessary to feed a large number of baking trays sequentially into the tray conveyor system and, in long baking runs where the numbe of articles to be baked exceeds the capacity of the pans necessary to fill the system between the depositer and the remover, it is desirable to recirculate the pans from the depanner 25 back to the panner 21. However, on the completion of a baking operation, it is necessary to remove the pans from the system and, if a different size or type of bakery product is to be produced requiring different pans, it is necessary to introduce a different size or style of pan. As diagrammatically shown in FIG. 8, a tray conveyor section 20is arranged to convey trays from the depanner to a stacking apparatus 26 and a conveyor section 20f is arranged to convey trays from the stacker 26 to an unstacker 27, trays from the unstacker being conveyed by a further tray conveyor section 20g to the panner 21. As also diagrammatically shown in FIG. 8, stacks of trays from the stacker 26 are conveyed by a stack conveyor 30a to stack storage zones, conveniently in the form of gravity type roller conveyors designated 31a–31e. A further stack conveyor 30b is conveniently provided to convey stacks of trays from selected ones of the stack storage zones 31a–31e to the unstacker 27. While a pan stacker and a pan unstacker are diagrammatically shown in FIG. 8 for respectively removing and feeding baking pans into the pan conveyor system, it will be apparent that a lid stacker and a lid unstacker can also be provided in the lid conveyor system 32 extending between the delidder 24 and the lidder 22.

Figure 1:
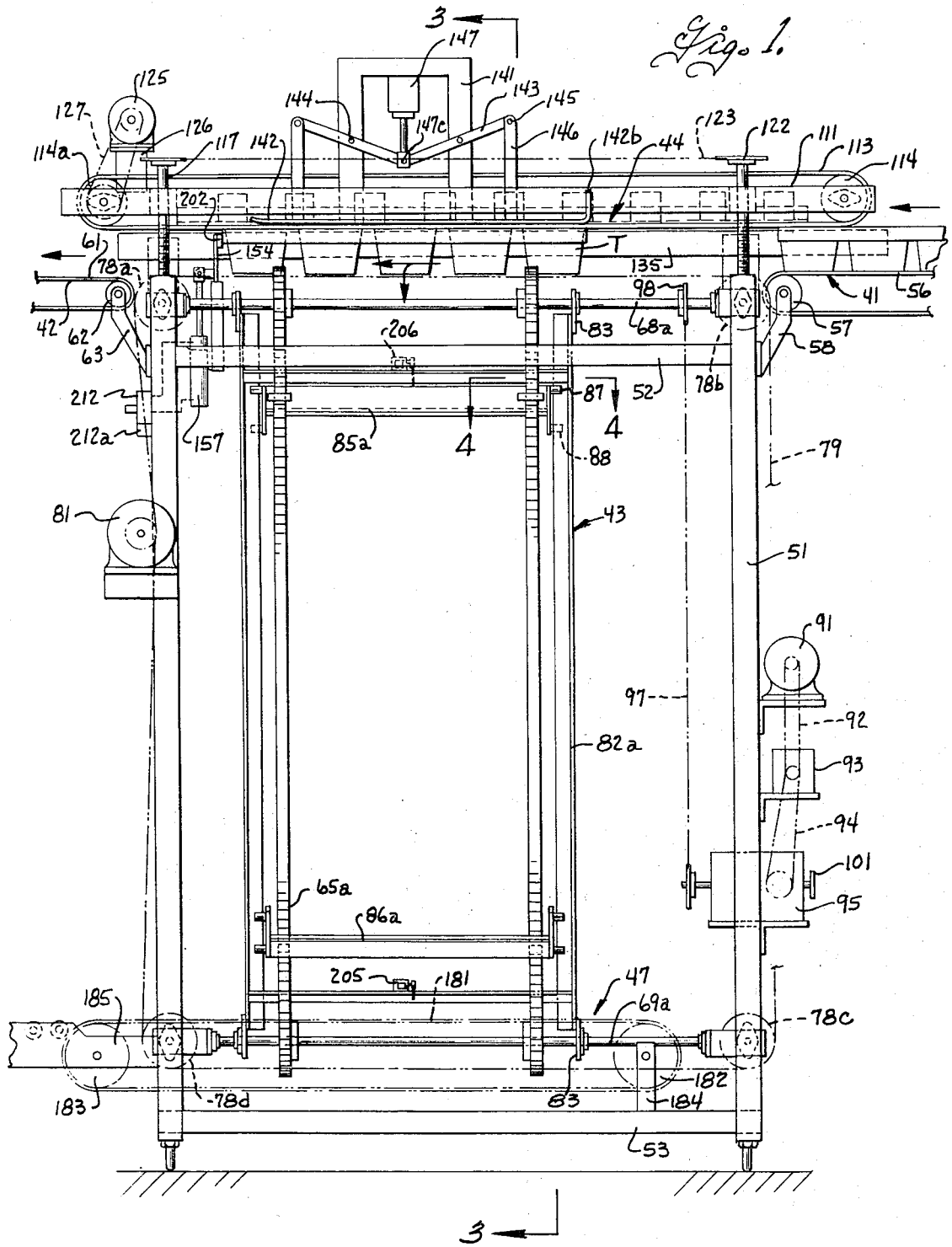
FIG. 1 is a side elevational view of a tray transfer apparatus for use in stacking trays.

Referring now more specifically to FIG. 1, the tray transfer apparatus in general includes inlet and outlet tray conveyors 41 and 42 arranged to underlie and support the baking trays and having their adjacent ends spaced apart at relatively opposite sides of a stack elevator mechanism 43. A magnetic overhead conveyor 44 is spaced above the stack elevator and above the adjacent ends of the inlet and outlet tray conveyors to pick up a tray from the inlet conveyor 41 and move it laterally across the top of the elevator. A tray transfer mechanism 45 is positioned above the elevator for transferring trays from the overhead conveyor to the stack on the elevator, and provision is made for rendering the tray transfer means inoperative so as to allow the baking trays to move from the inlet conveyor along the overhead conveyor to the outlet conveyor without passing to the stack. A stack conveyor 47 is provided adjacent the lower end of the elevator to move stacks of baking trays laterally of the elevator.

In the embodiment shown in FIGS. 1–6, the tray transfer apparatus is arranged to effect stacking of trays from the tray conveyor system, the apparatus with some modifications in construction and controls, being also arranged to effect unstacking of baking trays.

The stacking apparatus has a rigid frame structure including upright members 51 adjacent the four corners of the machine; upper and lower lengthwise extending frame members 52 and 53, and upper and lower crosswise extending frame members 54 and 55 all rigidly interconnected to form a rigid framework. The tray infeed conveyor 41 is preferably of the endless belt type including a belt 56 and a belt engaging roller 57 supported as by a bracket 58 on the frame structure. The outlet conveyor 42 is also conveniently of the endless belt type including a belt 61 adapted to underlie and support baking trays, which belt is entrained over a belt engaigng roller 62 conveniently mounted as by a bracket 63 on the frame structure.

Figure 2:
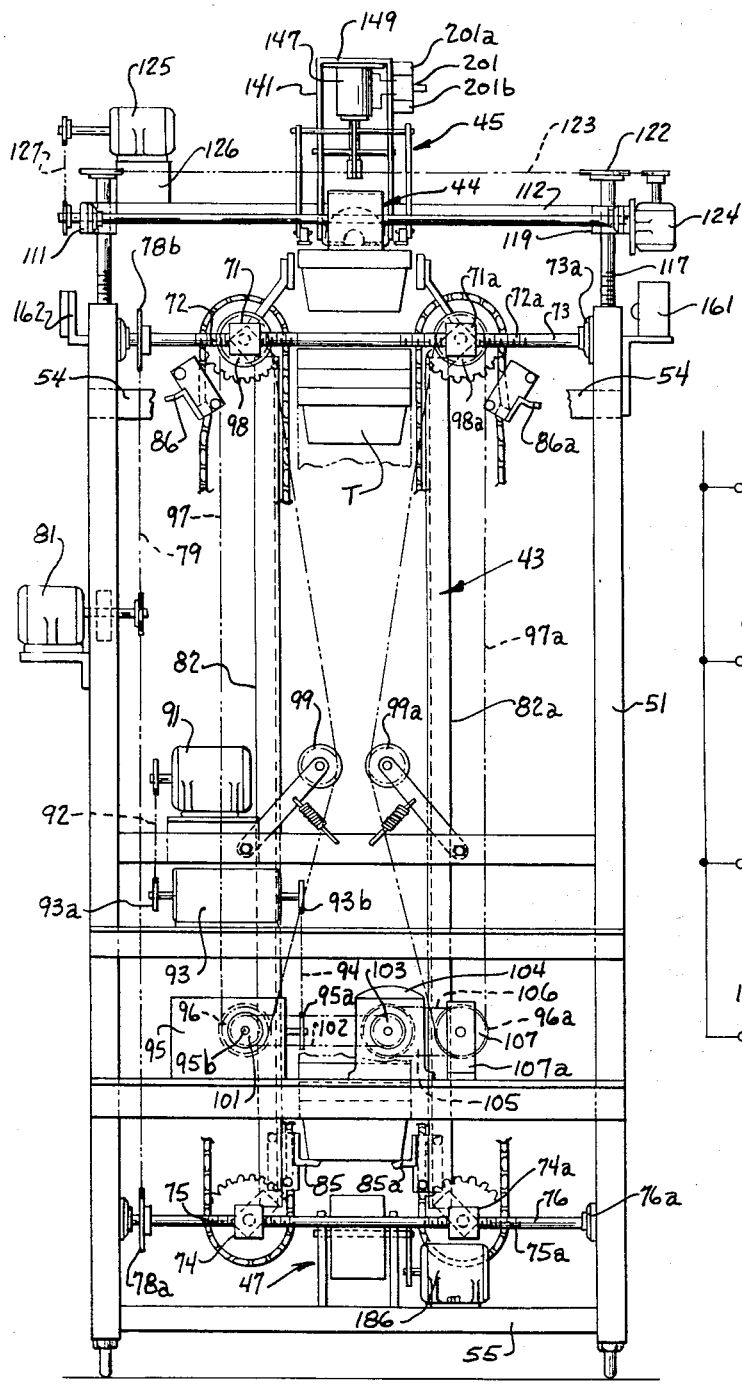
FIG. 2 is an end elevational view of the ray transfer apparatus of FIG. 1.

The stack elevator 43 is of the endless chain type and includes pairs of endless chains 65 and 65a disposed at relatively opposite sides of the article stack. One pair of chains 65 are disposed around upper and lower sprockets 66 and 67 nonrotatably secured to upper and lower shafts 68 and 69 respectively and the other pair of chains 65a are disposed around upper and lower sprockets 66a, 67a mounted on shafts 68a and 69a respectively. The pairs of chains are mounted for adjustment relative to each other in a direction laterally of the apparatus to accommodate baking trays of different widths and, as best shown in FIGS. 2, 3 and 5, the ends of the upper shafts 68, 68a are rotatably mounted on followers 71, 71a that engage and are supported by oppositely threaded portions 72, 72a of upper cross shafts 73. Shafts 73 are rotatably supported at their ends by bearings 73a on the upper ends of the uprights 51 so that the upper ends of the chains 65, 65a can be laterally adjusted toward and away from each other by rotating the shaft 73 to adjust the followers 71, 71a therealong. The lower shafts 69, 69a are similarly rotatably mounted at their ends on followers 74, 74a that engage and are supported by oppositely threaded portions 75, 75a of lower cross shafts 76. The ends of the shafts 76 are supported by bearings 76a on the rigid frame uprights 51 so that, upon rotation of the shafts 76, the lower followers 74, 74a are also adjusted toward and away from each other. Sprockets 78a–78d are provided on the pairs of upper and lower shafts 73 and 76 and are drivingly interconnected by a chain 79. A reversible motor 81 has a drive sprocket that engages and drives the chain 79 to reversibly drive the shafts 73 and 76 and thereby effect lateral adjustment of the elevator chains 65, 65a. Guide rails, conveniently in the form of angle irons 82, 82a are supported at their upper and lower ends by brackets 83 that rotatably receive shafts 68, 68a and 69, 69a. The guide rails extend between the upper and lower shafts alongside respective ones of the elevator chains 65, 65a. Pairs of stack support members 85, 86 and 85a, 86a are attached to the pairs of chains 65, 65a by suitable brackets as best shown in FIG. 4, to extend horizontally between the chains of each pair, and followers 87, 88 are mounted on brackets 89 at the ends of each of the stack support members to guidably engage the rails 82, 82a to maintain the stack support members in a horizontal support position as shown in FIGS. 2 and 3, during movement of the stack support members along the rails. As shown, the followers 87, 88 are vertically and laterally offset from each other to engage the rear and front sides of the guide rails at vertically spaced points therealong to prevent tilting of the stack support members 85, 86 and 85a, 86a. Two stack supporot members are provided on each pair of chains 65, 65a and are located at equally spaced intervals along the respective elevator chains so that only one of the stack support members on each chain is operative at any one time to support a stack of trays, the other stack support member being located along the return run of the elevator chains.

The elevator drive mechanism is best shown in FIGS. 1 and 2 and includes a drive motor 91, which is connected through a drive chain 92 to the input shaft 93a of a clutch and brake mechanism 93. The output shaft 93b of the clutch and brake mechanism is connected through a drie chain 94 to the input shaft 95a of a speed reducer 95. The output shaft 95b of the speed reducer is connected through a sprocket 96 and chain 97 to a sprocket 98 on the upper elevator shaft 68, a movable chain tightening sprocket 99 being provided and yieldably urged by a spring in a direction to take up slack in the chain 97. The speed reducer output shaft 95b is also connected through a sprocket 101 and chain 102 to an input sprocket 103 on a gear box 104 having an output sprocket 105 which is driven in the reverse direction from its input sprocket. The output sprocket of the gear box 104 is connected through a chain 106 to a sprocket 17 supported by a bearing bracket 107a and an elevator drive sprocket 96a is nonrotatably connected to the sprocket 107 and drives a chain 97a entrained over a sprocket 98a on shaft 68a. A second idler sprocket 99a is provided to take up slack in the chain 97a. The above-described elevator drive is operative to drive the conveyor chains 65, 65a in timed relation to each other and in relatively opposite directions, while accommodating lateral adjustment of the elevator chains relative to each other. In the preferred embodiment disclosed herein, the motor 91 is arranged to be continuously driven and the elevator chains are intemittently driven under the control of the clutch-brake mechanism 93.

The overhead magnetic conveyor 44 extends between the inlet and outlet conveyors 41 and 42 and overlies the elevator and, advantageously, is mounted for vertical adjustment to accommodate baking trays of different height. In general, the overhead conveyor 44 includes a rigid conveyor frame structure having longitudinal members 111 and cross members 112. The overhead conveyor is of the endless type and includes a belt 113 entrained over rollers 114, 114a. Rollers 114 and 114a are nonrotatably secured to shafts 115, 115a respectively, and the latter are rotatably journaled by bearings 116 in the longitudinal conveyor frame members 111. Screws 117 threadedly engage followers in the upper ends of the upright frame members 51 and the screws rotatably extend through blocks 119 on the conveyor frame members 111 and have thrust collars 121 thereon that engage the underside of the blocks 119 to support the overhead conveyor frame on the screws. The overhead conveyor frame can thus be raised and lowered by rotating the screws 117 and sprockets 122 are nonrotatably seucred to the upper ends of the screws 117 and interconnected by a chain 123 driven as by a motor 124 (FIGS. 2 and 3).

As best shown in FIGS. 1 and 2, one of the overhead conveyor rollers such as the roller 114a is driven as by motor 125 mounted by a bracket 126 on the conveyor frame and connected through a drive chain 127 to a sprocket on the shaft 114a. The belt 113 for the overhead conveyor 44 is formed of a nonmagnetic material such as woven cloth or rubber, and a magnetic rail assembly is provided for magnetically attracting baking trays of ferromagnetic material to the lower run of the belt 113. As best shown in FIGS. 5 and 6, the magnetic rail assembly includes a pair of angle-iron rails 131 conveniently secured at their ends to the cross pieces 112 of the conveyor frame. A plurality of magnets 132, conveniently of the permanent magnet type, are provided at spaced locations alonthe rails 131 and secured to the rails as by bolts 133. The rails 131 are formed of ferromagnetic material and form pole pieces for the magnets while guiding the lower run of the conveyor therealong. As will be apparent, electromagnets could be utilized if desired.

The overhead conveyor is veritcally adjusted relative to the inlet and outlet conveyors 41 and 42 so that the lower run of the overhead conveyor is spaced thereabove a distance approximating the height of a baking tray T and, preferably, the overhead conveyor overlaps the inlet conveyor 41 as shown in FIG. 5 to assure pick up of the trays by the overhead conveyor before they pass off the end of the inlet conveyor 41. Lateral tray guide rails 135 are provided for laterally guiding the trays from the inlet conveyor onto the overhead conveyor to laterally position the same with respect to the elevator. As shown in FIGS. 3 and 5, lateral tray guide rails are advantageously mounted by brakcets 137 on the followers 71, 71a for the elevator and are positioned so as to be vertically aligned with the inner sides of the elevator chains 65, 65a. Thus, the lateral guides are adjustable with the elevators to accommodate pans of different width.

The tray transfer mechanism 45 is arranged to transfer the trays between the overhead conveyor 44 and the elevator 43. The tray transfer apparatus shown in FIGS. 1-6 is arranged for operation as the tray stacker and the tray transfer mechanism 44 is accordingly arranged to eject trays from the overhead magnetic conveyor to cause the trays to drop onto the stack. This transfer mechanism is best shown in FIGS. 5 and 6 and includes a rigid frame structure herein shown in the form of a pair of U-shaped side members 141 conveniently secured to the rails 131 of the overhead conveyor to extend above the overhead conveyor 44. Tray engaging shoes 142 are disposed at relatively opposite sides of the overhead magnetic conveyor 44 and have a length preferably corresponding to the length of the trays T. The tray engaging shoes are mounted for vertical reciprocation and, in the embodiment shown, a pair of levers 143 are pivotally mounted intermediate their ends on pins 144 that extend between the yokes 141. The outer ends of the levers 143 are connected by cross rods 145 and links 146 to ears 142a on the shoes 142 to raise and lower the shoes in response to vertical swinging movement of the levers 143. An operator, conveniently of the linear fluid actuated type including a cylinder 147 and a rod 147a, is mounted on a cross member 149 that extends between the yokes 141. The piston rod 147b of the operator has a pin 147c that extends through slots 143a in the inner ends of the levers 143 to raise and lower the inner ends of the levers in response to movement of the piston rod 147b. A tray stop finger 142b is provided at the inlet end of the shoes 142 ahd arranged to engage a succeeding tray on the overhead conveyor to stop a succeeding tray on the overhead conveyor at a location in advance of the elevator when the shoes are moved downwardly to eject a tray over the elevator.

A pan stop is provided for stopping pans as they move along the overhead conveyor, to position the same above the elevator 43. The pan stop is mounted for movement into and out of an operative position and, as shown, comprises a slide 154 that is mounted for vertical movement in guideways 155 secured as by a mounting bracket 156 to the main frame structure. An operator 157, conveniently of the linear fluid actuated type, is provided for raising and lowering the tray stop and, as best shown in FIG. 5, the cylinder portion of the operator 157 is secured to the bracket 156 and the rod portion 157b is connected to the tray stop to raise and lower the same.

The elevator drive mechanism is intermittently operated to maintain the top of the stack of trays at a level slightly below the level of the inlet and outlet conveyors 41 and 42 and below the bottom of a tray carried by the overhead conveyor. A stack height sensing mechanism, conveniently in the form of a photoelectric cell 161 and mirror 162 is mounted so that the light beam from the photoelectric cell 161 is interrupted whenever the top of the stack is above the level of the inlet and outlet tray conveyors. In addition, a second sensing device, also conveniently in the form of a photoelectric unit 163 and mirror 164 is mounted to sense the presence of a tray above the pan stop 154. The photoelectric unit 163 and mirror 164 are preferably arranged so that the light beam from the unit 163 extends diagonally across the location of the pan stop as best shown in FIG. 5 so that the light beam will be interrupted by a tray somewhat in advance of the tray reaching a position over the tray stop, and will remain interrupted until the tray passes beyond the tray stop.

Figure 11:
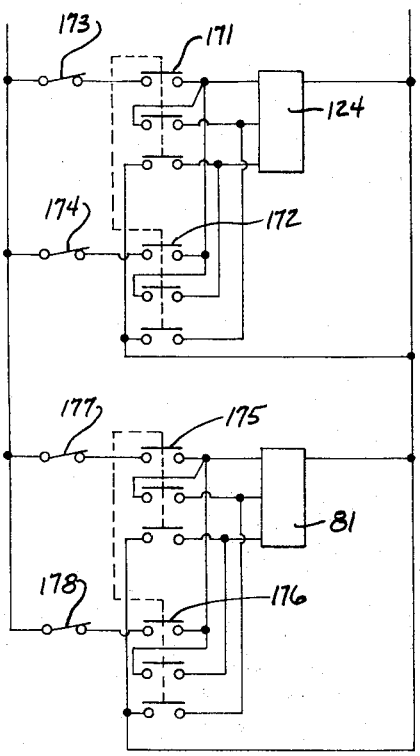
FIG. 11 is a schematic circuit diagram illustrating the electrical controls for use in adjusting the apparatus to accommodate trays of different width and height.

A control circuit for operating the pan height and width adjusting motors 124 and 81 is shown in FIG. 11. Motor 124 is of the reversible type which can be selectively energized in a forward or reverse direction by multiple pole switches 171 and 172 each connected to the motor 124 through respective limit switches 173 and 174. For example, switch 171 is arranged to energize the motor in one direction to effect raising of the overhead conveyor and limit switch 173 is arranged so as to open when the overhead conveyor reaches a preselected upper limit of travel to prevent damage to the motor. Switch 172 is connected to the motor 124 to operate it in a reverse direction so as to lower the overhead conveyor and limit switch 174 is arranged to be opened when the overhead conveyor reaches a preselected lower limit of travel. Similarly, motor 81 for adjusting the width of the elevators includes multiple pole switches 175 and 176 connected to the motor 81 so as to respectively operate the same in a forward and reverse direction and limit switches 177 and 178 are connected in series with the switches 175 and 176 respectivey to stop the motor 81 when the elevators reach a preselected inward limit of travel and a preselected outward limit of travel respectively, to prevent damage to the motor. The stack conveyor 47 is disposed adjacent the lower end of the elevator and is conveniently of the endless type including a belt 181 entrained over rollers 182 and 183 rotatably mounted as by brackets 184 and 185 on the frame and driven by a motor 186. The upper run of the stack conveyor is disposed at a level slightly above the axes of the lower elevator sprockets as best shown in FIG. 3 so as to engage and convey a stack laterally when the stack is lowered.

A control circuit suitable for operating the apparatus as a tray stacker is shown in FIG. 12. The overhead conveyor drive motor 125, the elevator drive motor 91 and the stack conveyor drive motor 186 are connected in parallel and through contacts 191a of a motor start relay 191 to a source of electrical power S. The power source is also connected through a transformer 192, the secondary of which is connected to low voltage conductors 193 and 194. A normally closed stop switch 195 and a normally open start switch 196 are connected in series with the motor start relay 191 which is operative, when energized, to close the relay contacts 191a to start the motors 125, 91 and 186. Relay 191 also closes contacts 191b connected in parallel with the start switch 196 to establish a holding circuit to maintain the relay energized when the start switch is released. An indicator lamp 197 is connected in parallel with the relay 191 to indicate when the latter is energized. The aforementioned holding circuit also controls the application of power to conductor 193a and photoelectric units 161 and 163 are connected as by conductors 199 to the power conductors 193a and 194 so as to be energized when the main motor control relay 191 is energized.

Fluid is reversibly supplied to the operator 147 of the article transfer mechanism under the control of a valve 120 (FIGS. 2 and 3). The valve 201 is conveniently of the electrically operated type having electroresponsive operators 201a and 201b arranged so that, when one operator such as 201a is energized, the valve is moved to one position to supply fluid in one direction to the operator 147, and the valve then remains in that position until the other electroresponsive operator 201b is energized to return the valve to its initial position and reverse the application of fluid pressure to the operator 147. A normally open pan switch 202 is provided on the tray stop 154 and is arranged to be moved to a closed position when engaged by a tray. Limit switches 203a and 203b are mounted as diagrammatically shown in FIG. 9 so as to sense when the transfer mechanism is respectively in its raised position shown in FIG. 1 and a lowered position. Switches 203a and 203b are of the normally open type and switch 203a is closed when the transfer mechanism is in its raised position and 203b is closed when the transfer mechanism moves downwardly to its tray eject position. Switches 203a and 203b are connected in series with their respective valve operators 201a and 201b and are connected through the tray sensing switch 202 and normally closed relay contacts 207c to the power conductor 193a. When a tray closes the switch 202, it establishes a circuit through limit switch 203a (closed when the shoes are in their raised position) to energize the valve operator 201a and apply fluid pressure to the actuator 147 to move the tray engaging shoes 142 downwardly. When the tray engaging shoes begin to move downwardly, the switch 203a is opened and, when the shoes move to a level slightly below the lower run of the overhead conveyor, they eject the pan from the overhead conveyor. Before the tray sensing switch 202 is opened, the shoes move downwardly to a position closing switch 203b to energize the operator 201b and thereby move the actuator back to its raised position. The tray sensing switch 202 opens after the tray drops from the overhead conveyor and before the tray engaging shoes are retracted to a position closing switch 203a to prevent recycling of the transfer mechanism 45.

Figure 9:
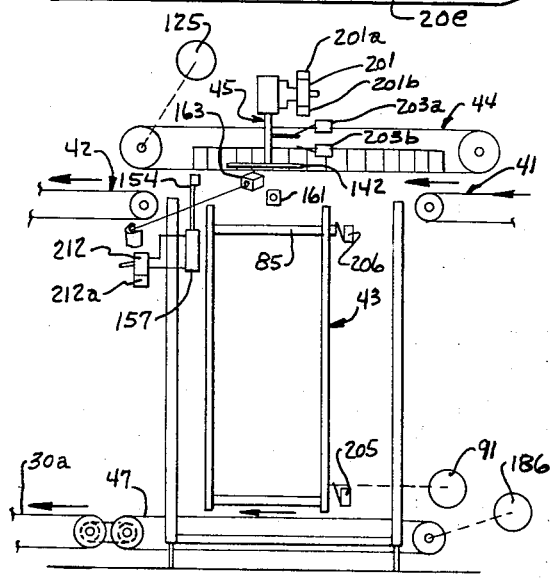
FIG. 9 is a diagrammatic view of a tray transfer apparatus arranged for operation as a tray stacker.

The clutch-brake mechanism 93 has an electroresponsive operator 93c which is operative, when energized, to engage the clutch and disengage the brake and, conversely, operative when deenergized to disengage the clutch and engage the brake to stop the elevator drive. Electroresponsive operator 93c is connected to the power conductor 193a through a normally open pan sensing switch 202a which is arranged to be operated in unison with the switch 202. Normally open relay contacts 207b are connected in parallel with the switch 202a and normally open photoelectirc relay contacts 161a are also connected in parallel with the switch 202a. When a tray engages the stop 154, it closes switch 202a to energize the operator 93c for the elevator clutch to start the elevator drive and began lowering of the stack. Normally open photoelectric relay contacts 161a are operated by the stack height sensing photoelectric unit 161 and are closed when the tray is dropped onto the stack and interrupts the light beam from the photoelectric unit 161 so that the elevator clutch remains energized until the stack has lowered sufficient to reestablish the light beam to photoelectric unit 161. With this arrangement, the elevator drive is intermittently operated to lower the stack of trays on the elevator to position the top of the stack at the level adjacent to but slightly below the level of the inlet and outlet tray conveyors 41 and 42. When a predetermined number of trays have accumulated in the stack, the tray elevator closes a normally open limit switch 205 conveniently positioned as shown in FIGS. 3 and 9 to sense when one of the stack supports 85 reaches a preselected lower position corresponding to a full stack of trays on the elevator. Switch 205 is connected in a series circuit with a normally closed limit switch 206 to a control relay 207 to energize the control relay when the switch 205 is closed. Relay 207 is arranged to close normally open relay contacts 207a connected in parallel with the limit switch 205 to establish a holding circuit for the control relay and relay 207 also controls the aforementioned contacts 207b connected in parallel with the limit switch 202a and photoelectric relay contacts 161a so as to establish a circuit to the operator 93c for the elevator clutch. Thus, when the limit switch 205 is operated to its closed position in response to accumulation of a predetermined number of trays in a stack, the elevator clutch is energized under the control of relay 207 and contacts 207b and remains energized to lower the stack of trays onto the stack conveyor and to bring the other stack support into position to support a tray at a level adjacent the inlet conveyor. Limit switch 206 is conveniently positioned as shown in FIGS. 3 and 9 to sense when the stack support has moved into a position to receive the first tray in the stack and to support the same as the aforementioned leve. Switch 206 is then opened to break the circuit to the control relay 207 and deenergize the clutch actuator 93c. A selectively operable manual switch 209 is conveniently connected in parallel with the limit switch 205 to enable selective dumping of partial stacks of trays. Control relay 207 is also operative, when energized, to open the aforementioned relay contacts 207c, to prevent operation of the tray transfer mechanism during indexing of the stack elevator.

In the long baking runs it is desirable to recirculate the pans from the depanner 25 back to the panner 21 without passing the pans through the stacking and unstacking apparatus. The overhead magnetic conveyor 44 is arranged to transfer trays from the inlet conveyor 41 to the outlet conveyor 42 and provision is made for retracting the tray stop 154 to allow bypassing of the stacking apparatus. The inlet and outlet conveyors are driven as by motors (not shown) at linear speeds approximately equal to the linear speed of the overhead conveyor 44 so that there will be a smooth transfer of trays from the inlet conveyor to the overhead conveyor and from the overhead conveyor to the outlet conveyor. The fluid actuator 157 for the tray stop is operated under the control of a valve 212 (FIG. 9) having an electroresponsive operator 212a. The valve 212 is of a type which is normally positioned to apply fluid pressure to the operator 157 to hold the tray stop in its raised position and the valve is operative, when the electroresponsive operator 212a is energized, to move the tray stop to its lower position to permit straight-through feed of the baking trays from the inlet conveyor along the overhead conveyor to the outlet conveyor. The tray stop operator 212a and a relay 218 are connected in parallel with each other and in series with a normally open mode switch 214, a normally open remote signal switch 215a, and normally closed relay contacts 163a operated by photoelectric relay 163. If the mode switch 214 is moved to its open position, valve actuator 212a will be deenergized and the valve 212 will move to a position raising the tray stop to start stacking of trays. However, when the mode switch 215 is moved to its closed position for automatic operation, stacking of trays will be under the control of the remote signal switch 215a. Switch 215a is normally closed to energize the tray stop valve operator 212a, when relay contacts 163a are closed. Relay contacts 163a, as noted above, are normally closed and are opened only when the light beam of photoelectric unit 163 is interrupted indicating the presence of a tray over the elevator and tray stop. The remote signal switch 215a is preferably operated by a photoelectric unit 215 positioned as diagrammatically shown in FIG. 8 to sense a back-up or jam-up of trays in the conveyor system 20f downstream of the article stacking apparatus and the remote photoelectric unit 215 is arranged to open the relay contacts 215 whenever a back-up of trays occurs in the conveyor. The photoelectric unit 215 must be arranged to prevent opening of the contacts 215a due to the intermittent interruption of the light beam caused by trays passing the unit 215, and to open the relay contacts 215a only when the light beam remains interrupted for a time interval in excess of that normally caused by a passing tray, and which extended light beam interruption would indicate a jam-up of trays in the conveyor system. For example the photoelectric unit may be of a type which delays opening of contacts 215a for a predetermined time interval after the light beam is interrupted, which interval is sufficient to allow passage of an individual tray past the photoelectric unit. If the light beam is reestablished in that time interval, the photoelectric unit will continue to hold the contacts 215a open to allow trays to bypass the stacker. However, if the light beam is interrupted for a time greater than that interval, then the contacts 215a will be opened to commence stacking of trays. Thus, when the mode switch 214 is moved to its closed or automatic position, and relay contacts 215a are closed indicating the absence of a jam-up in the outlet conveyor system, and relay contacts 163a are closed indicating the absence of a tray above the elevator and adjacent the tray stop, then valve actuator 212a will be energized to lower the tray stop. Relay 218 will also be energized to close contacts 218a to maintain actuator 212a energized as contacts 163a open and close due to the trays moving past the photoelectric unit 163.

It is also necessary to prevent raising of the tray stop when a tray is in position over the tray stop and for this purpose, normally open relay contacts 218b are connected in series with normally open relay contacts 163b to the valve actuator 212a and relay 218. Relay contacts 218b are closed when the relay 218 is energized and relay contacts 163b are operated under the control of photoelectric unit 163, so as to be closed when the light beam to the unit 163 is interrupted and opened when the light beam is again established, indicating the absence of a tray over the tray stop. Thus, when relay contacts 215a are opened indicating a jam-up of trays in the outlet tray conveyor, or if the mode switch 214 is opened, the holding circuit including relay contacts 163b and 218b will maintain the tray stop actuator 212a energized until photoelectric relay 163 opens contacts 163b indicating that the trays have cleared the area over the tray stop. The tray stop can then move to its raised position to begin a stacking operation.

The tray transfer apparatus can also be arranged for operation as a tray unstacker to feed trays from a stack into the tray conveyor system. The construction of the tray unstacker is substantially the same as the stacker and like numerals are used to designate corresponding parts. The tray unstacker does not require a tray stop and the tray stop can accordingly be omitted. In addition some modification of the tray transfer mechanism 45 and the circuitry for controlling the apparatus is necessary for operation as an unstacker. As shown in FIG. 7, the tray transfer mechanism 45' is provided with tray engaging shoes of ferromagnetic material 142' having magnetic means associated therewith and arranged to magnetically attract a ferromagnetic tray to the shoes to enable the shoes to pick up a pan from the top of the stack and raise it to the underside of the overhead magnetic conveyor 44. In the preferred embodiment, permanent magnets are utilized, it being understood that electromagnets could be utilized along the shoes 142'. In addition, the operating mechanism for raising and lowering the shoes is arranged to move the shoes through a relatively greater distance than in the stacker and sufficient to engage the top tray in the stack and raise the tray to the underside of the overhead conveyor. As shown in FIG. 7, the shoes 142' are vertically raised and lowered by a pair of crank arms 143' connected by pins 145' to upper ends of links 146', the lower ends of which links are pivotally connected to ears 142a' on the shoes 142'. The cranks are rotated in unison with each other by a chain 144' entrained around sprockets 144a' which are nonrotatably connected to respective ones of the cranks 143' so that the shoes remain horizontal during raising and lowering. The sprockets and cranks are rotatably mounted on support members 149' conveniently supported by brackets 141' on the rails 131 of the overhead conveyor. A linear actuator including a cylinder 147' attached to the support members 149', and a rod 147a', is provided for operating the transfer mechanism. The rod 147a' is connected at 147b' to the chain 144' and the rod has sufficient travel to cause the cranks to move through a complete revolution when the rod is moved in one direction; and to move through a second revolution when the rod is moved in the opposite direction.

Vertical guide rods 150' are rigidly attached to the shoes 142' and slidably extend through fixed guides 151' to inhibit lengthwise shifting of the shoes during vertical movement of the latter. A valve 201' is provided for reversibly supplying fluid such as air under pressure to the cylinder 147' and the valve has electro-responsive actuators 201a' and 201b'. Limit switch 203' is provided for sensing travel of the rod 147a' of the linear actuator 147'.

A modified control circuit shown in FIG. 13 is utilized to operate the tray unstacking apparatus. In the unstacking apparatus, the top belt drive motor 125 is energized under the control of relay contacts 301a controlled by relay 301; the elevator drive motor 91 is reversibly energized under the control of relay contacts 302a and 303a respectively operated by forward and reverse relays 302 and 303, and the stack conveyor drive motor 186 is energized under the control of contacts 304a operated by relay 304. For reasons pointed out hereinafter, the inlet tray conveyor 41 of the stacker is driven at approximately the same speed as the overhead conveyor 44 by a drive motor 120 also energized under the control of relay contacts 301a that control the overhead conveyor drive motor 125. The control circuit includes power conductors 306 and 307 energized from the secondary of transformer 308. The relay 301 which controls energization of the tray conveyor drive motor 125 is energized under the control of a three-position mode switch which is operative, in the off position shown in FIG. 13, to interrupt application of power to the relay 301 and which is operative in its on position to close switch 309a to energize the relay 301. The mode switch is also operative in its "auto" position to open contacts 309a and close contacts 309b which last-mentioned contacts are connected in a series circuit with normally closed relay contacts 311a.

The forward relay 302 for energizing the elevator drive motor 81 is connected in series with normally closed relay contacts 303a controlled by the reverse relay 303, normally open manually operable start switch 313, normally closed manually operable stop switch 314, and an elevator mode switch 315 having one set of contacts 315a which are closed when the switch 315 is in one position and a second set of contacts 315b which are closed when the switch is in the other position. Thus, when switch 315 is in its "unstack" position closing contacts 315a, and when start switch 313 is closed, the forward relay 302 is energized and closes normally open relay contacts 302a in parallel with the start switch to establish a holding circuit. The forward relay will thus remain energized until either the stop switch 314 is opened or the reverse relay 303 is energized to open relay contacts 303a or the mode switch 315 is moved to a position opening contacts 315a and closing contacts 315b. An indicator light 316 is conveniently connected in parallel with the relay 302 to indicate when the elevator motor is energized in its forward direction. The elevator motor is normally energized in its forward direction during unstacking. However, it is sometimes desirable to discharge a partial stack from the unstacking apparatus and, for this purpose, the reverse relay 303 is connected in a series circuit with normally closed relay contacts 302b controlled by forward relay 302, a normally open manually operable switch 318 and the switch contacts 315b of the mode switch 315. When the mode switch is in its "lower" position closing contacts 315b, and the manually operable switch 318 is closed, the reverse relay 303 is energized to close contacts 303a and operate the elevator in a reverse direction.

The elevator forward drive relay 302 also is operative, when energized, to close contacts 302c to apply power from conductor 306 to conductor 306a. The photoelectric unit 161' for sensing the level of the top of the stack, the photoelectric unit 163' and the photoelectric unit 311 are connected so as to be energized when the relay contacts 302c are closed. Photoelectric unit 163' is arranged with its mirror 163a', as diagrammatically shown in FIG. 10, to sense the presence of a tray on the overhead conveyor 44 from a point in advance of the inlet side of the elevator 43 to a point after the outlet side of the elevator. The photoelectric unit 311 is arranged with its mirror 311a', as diagrammatically shown in FIG. 8, to sense a back-up of trays on the outlet conveyor section 20g that extends from the unstacker 27. The relay 304 for controlling energization of the stack conveyor motor 186 is connected through contacts 321a of a mode switch 321, normally open limit switch 322, and relay contacts 323a controlled by a relay 323 to the power conductor 306a. Limit switch 322 is normally open and is positioned as diagrammatically shown in FIG. 10, so as to be energized to its closed position when the stack on the elevator is substantially depleted and the elevator has moved so that the tray supports 85, 85a are at a level above the level of the top of a succeeding stack. The mode switch 321 is normally in the position shown in FIG. 13 closing contacts 321a and opening contacts 321b so that, when the switch 322 is closed, relay 304 is energized to close motor control relay contacts 304a to energize the stack drive motor 186 to drive the stack conveyor in the direction indicated by the arrows in FIG. 10 and advance a stack from conveyor 30b toward the unstacker. As diagrammatically shown in FIG. 10, the stack conveyor section 30b is conveniently driven by a power take-off 47a' from stack conveyor 47. Relay 304 also closes relay contacts 304b connected in parallel with the limit switch 322 to establish a holding circuit to maintain the motor 186 energized, until the relay contacts 323a are opened. The stack conveyor 30b, 47 will then advance a succeeding stack into a position between the chains of the elevator and, when the stack is in position, it closes a limit switch 326 positioned as diagrammatically shown in FIG. 10 to sense when a stack is in proper position on the stack conveyor 47 between the chains of the elevator 43. Closing limit switch 326 energizes relay 323 to open the normally closed relay contacts 323a and stop the stack conveyor drive motor 186. The mode switch 321 is operable in a second position thereof to open contacts 321a and close contacts 321b to directly energize the motor control relay 304 to drive the stack conveyor 47 in the direction indicated by the arrow in FIG. 10 and move a stack out of a position below the elevator onto a stack outlet conveyor 47b'.

Figure 10:
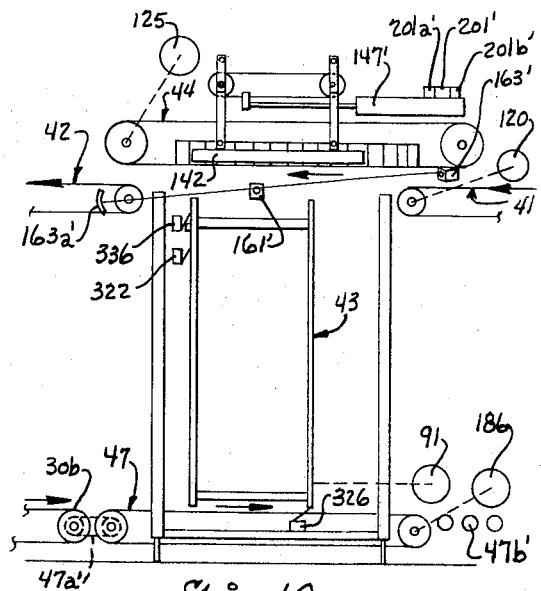
FIG. 10 is a diagrammatic view of a tray transfer apparatus arranged for operation as a tray unstacker.

Limit switch 203' is arranged as diagrammatically shown in FIGS. 7 and 10 to be actuated when the rod 147a' of the actuator 147' is retracted a distance to drive the crank arms 143' through one complete revolution. Limit switch 203' includes normally closed switch 203a' connected in series with the valve operator 201a' and a normally open switch 203b' connected in series with valve operator 201b'. Limit switches 201a' and 201b' are normally in the positions shown in FIG. 13 and are respectively moved to their open and closed positions when the piston rod is retracted a distance to drive the cranks 143' through a complete revolution. Valve 201' is similar to the previously described valve 201 and is of a type which is arranged to move to a first position when one of the actuators 201a' is energized, and the valve then remains in that position until the other actuator 201b' is energized to return the valve to its initial position. Power to the actuators 201a' and 201b' is under the control of manually operable switch 324, normally open relay contacts 163a' controlled by photoelectric relay 163', and normally closed relay contacts 161a' controlled by photoelectric relay unit 161'. As previously described, photoelectric relay unit 161' is arranged to sense the top of the stack on the elevator and operates to close relay contacts 161a' when the top of the stack is slightly below the level sensed by the unit 161'. Photoelectric unit 163' senses the presence or absence at any location of a tray on the overhead conveyor 44 between a location substantially in advance of the elevator to a location adjacent the outlet end of the overhead conveyor, and the relay contacts 163a' are open when the tray is in that area and the contacts are closed in the absence of a tray in that area. Accordingly, if the top of the stack is at the proper level sensed by photoelectric unit 161', and in the absence of a tray on the overhead conveyor sensed by the photoelectric unit 163', operation of the tray transfer actuators 201a' and 201b' will be controlled by manual switch 324. When switch 324 is closed, the valve actuators 203a' and 203b' will be cyclically operated to pick up a tray from the top of the stack and transfer it to the overhead magnetic conveyor. In particular, when a tray moves off the overhead conveyor to the outlet conveyor 42 and photoelectric unit 163' closes relay contacts 163a', valve actuator 201a' is energized to retract the piston rod 147a' to thereby rotate the cranks 143' through one revolution and move the shoes 142a' first down to pick up a tray from the stack and then up to transfer the tray to the overhead conveyor. When the piston rod reaches the end of its retraction, it operates limit switch 203 to open switch 203a' and close switch 203b'. However, as the shoes 142' pick up a tray from the stack, the tray interrupts the light beam of photoelectric unit 163' and opens contacts 163a' to prevent energization of valve actuator 203b' until the overhead conveyor has moved the tray away from a position over the stack. When the tray passes the light beam from unit 163', contacts 163a' are again closed to operate the shoes 142' through another tray pick-up cycle.

The electroresponsive operator 93c for the elevator clutch-brake mechanism is energized under the control of relay contacts 161b' operated by the stack level photoelectric sensing unit 161' to drive the elevator upwardly to maintain the top tray in the stack at the selected level. Relay contacts 161b' are open when the light beam is interrupted indicating that the stack is above the desired level, and are closed when the light beam is reestablished indicating that the stack is at or slightly below the desired level. Relay contacts 161b' are connected in series with normaly closed relay contacts 335a operated by relay 335 and normally closed relay contacts 303b operated by the aforedescribed elevator reverse relay 303 to energize the clutch-brake 93 when the stack is below the desired level and to deenergize the clutch-brake when the stack reaches the desired level. Relay contacts 303b are normally closed and are opened only when the relay 303 is energized to drive the elevator in a reverse direction. Relay contacts 335a are normally closed and are energized to their open position when relay 335 is energized under the control of limit switch 336. Limit switch 336 is normally open and is positioned as diagrammatically shown in FIG. 10 so as to be closed when the operative stack support member is moved to a position slightly above the position in which it supports the last stack at the desired level. When switch 336 is closed and energizes relay 335, relay 335 opens contacts 335a to prevent operation of the elevator under the control of the photoelectric unit 161', and closes contacts 335b connected in series with normally open relay contacts 323b so as to energize the elevator clutch-brake when both contacts 323b and 335b are closed. Relay 335 also operates, when energized, to close normally open contacts 335c connected in series circuit with normally open contacts 323c also controlled by relay 323 so as to establish a holding circuit for the relay 335 when the limit switch 336 is closed. This holding circuit maintains the relay 335 energized after the limit switch 336 opens and until the stack position sensing switch 326 opens in response to raising of a stack by the stack elevator off the stack conveyor. At that time, relay 335 is deenergized and closes contacts 335a so that continued movement of the elevator is controlled by the stack height sensing photoelectric unit 161'. The elevator reverse relay 303 for operating the stack elevator in reverse also operates to close normally open contacts 303c connected in series with the elevator clutch-brake actuator 93c so that, when the elevator drive motor is operated in its reverse direction, the clutch-brake is also energized to move the elevator in a reverse direction to lower the same and discharge a prtial stack onto the stack conveyor.

OPERATION

From the foregoing it is thought that the construction and operation of the apparatus for transferring pans between a stack and the tray conveyors will be readily understood. The same basic apparatus can be utilized for both a tray stacker and a tray unstacker. The magnetic overhead conveyor is arranged so that it will pick up trays from the incoming tray conveyor and move them across the elevator to the outlet conveyor. This enables bypassing of the stacker or unstacker when it is desired to recirculate the trays in the tray conveyor system.

When utilized as a stacking apparatus, the tray stop can be selectively moved into and out of position stopping a tray in position above the elevator and the switch 202 on the tray stop automatically operates the tray transfer mechanism to discharge a tray from the overhead conveyor to the stack. The elevator drive mechanism operates in response to the stack level to lower the stack and maintain the top of the stack at a level closely adjacent the level of the trays on the inlet and outlet conveyors. With this arrangement, the trays undergo only a relatively short drop determined by the height of the trays and, moreover, transferring of the trays from the overhead conveyor to the stack is effected in a single step so as to minimize the overall time required to stack each tray. Moreover, since the trays only drop through a relatively short distance determined by the height of the trays, the stack can accumulate to substantially the full height of the elevator before it is necessary to discharge the stack onto the stack conveyor. This not only increases the overall capacity of the apparatus for a given overall height, but additionally minimizes the transfer time necessary to move a succeeding stack support into position after a completed stack is discharged. The tray stop can be moved to its raised position by moving manually operable mode switch 214 to its open position to effect stacking of all trays that enter the stacking apparatus. Alternatively, when mode switch 214 is in its closed position, the tray stop will normally be in its lower position so that the trays entering the stacking apparatus will pass along the overhead conveyor 44 to the outlet conveyor 42 of the stacker. However, when the photoelectric unit 215 senses a back-up of trays on the outlet conveyor, it opens relay contacts 215a to effect raising of the tray stop to commence stacking until the back-up of trays on the outlet conveyor has cleared.

When utilized as an unstacker, the magnetic pick-up shoes 142' are cyclically operated to pick up trays from the top of the stack and transfer the trays to the overhead conveyor 44 for passage to the outlet conveyor 42. The photoelectric unit 163' will sense if a tray is entering the unit on the inlet tray conveyor 41 and will prevent operation of the unstacker until the tray has cleared the unstacker so as to automatically bypass trays from the inlet conveyor to the outlet conveyor. Switch 324 can be opened to stop operation of the unstacker. However, when switch 324 is closed, the operation of the unstacker will automatically be stopped if the photoelectric unit 311 senses a back-up of pans on the conveyor section 20g. As described above, photoelectric unit 311 operates to open relay contacts 311a when a back-up of pans is sensed and this operates to stop the overhead magnetic conveyor 44 and the inlet conveyor 41 (corresponding to conveyor section 20f in FIG. 8). When the overhead conveyor 44 of the unstacker is stopped, it cannot remove pans from above the elevator so that operation of the tray transfer mechanism 45 of the unstacker is also stopped. In addition, stopping of conveyor section 20f will also effect operation of the photoelectric unit 215 of the stacker to start stacking of trays entering the stacker.

While preferred embodiments of the invention are herein specifically disclosed, it will be apparent to those skilled in the art that modifications can be made within the scope of the appended claims.

The embodiments of the invention in which an exclusive property or privilege is claimed are defined as follows:

1. An apparatus for use in a recirculating loop baking tray conveyor system for transferring baking trays and the like of ferromagnetic material between a tray conveyor system and a stack comprising:

said recirculating loop baking tray conveyor system including inlet and outlet tray conveyor sections each adapted to underlie and support baking trays at a selected level and having adjacent ends spaced apart a distance substantially greater than the length of a tray, stack elevator means for supporting an upright stack of trays between said adjacent ends of said inlet and outlet tray conveyor sections, said stack elevator means including laterally spaced endless chains extending vertically downwardly from adjacent said preselected level at relatively opposite sides of the path of travel of the trays on the overhead conveyor means, said laterally spaced chains having stack supports at spaced locations therealong adapted to underlie and support the lowermost tray in a stack disposed between the chains, means for sensing the level of the top of the stack of trays between said chains, and elevator dirve means responsive to said stack level sensing for driving said chains to position the top tray in the stack at a level slightly below said selected level of said inlet and outlet tray conveyor sections, said baking tray conveyor system including an endless type overhead conveyor means having a generally horizontal lower run dimensioned to at least span the space between the inlet and outlet conveyor sections, magnetic means cooperable with said lower run for magnetically holding the top of a ferromagnetic baking tray against the lower run for movement therewith, and means mounting said overhead conveyor means for vertical adjustment relative to said inlet and outlet conveyor sections and to said endless chains of said stack elevator means to position said overhead conveyor means with its lower run at a level spaced above the selected level of the inlet and outlet tray conveyor sections a distance corresponding to the height of the baking trays to allow trays to move from the inlet conveyor section along the lower run of the overhead conveyor and onto the outlet section for recirculating the trays, and tray transfer means intermittently operable to transfer trays between the overhead conveyor means and the stack.

2. An apparatus according to claim 1 including means operative in response to advance of a tray along said overhead conveyor means to a position above said elevator means for operating said transfer means to move a tray from the overhead conveyor means to a stack on said elevator means.

3. An apparatus according to claim 1 including stop means mounted for movement between an operative position in the path of movement of trays along said overhead conveyor means and an inoperative position out of the path of movement of said trays, said stop means in said operative position thereof being arranged to stop trays on said overhead conveyor means above said elevator means.

4. An apparatus according to claim 3 including means operative when a tray engages said stop means for operating said transfer means to move a tray from the overhead conveyor means to a stack on said elevator means.

5. An apparatus according to claim 3 including selectively operable means for moving said stop means to its operative position, means for sensing the presence of a tray in the path of movement of said stop means and for preventing movement of said stop means to its operative position until the tray has cleared the path of movement of the stop means.

6. An apparatus according to claim 5 wherein said selectively operable means for moving said stop means to its operative position includes means for sensing a back-up of trays at a selected location along the outlet conveyor means in the tray conveyor system.

7. An apparatus according to claim 1 including means operative in response to advance of a tray along said overhead conveyor means to a position above said elevator means for operating said transfer means to discharge a tray from said overhead conveyor onto a stack on said elevator means, stack conveyor means adjacent the lower end of said elevator means for conveying a stack of trays laterally away from the elevator means, and means operative when a preselected number of trays has accumulated in the stack for operating said elevator means to lower the stack onto said stack conveyor means.

8. An appratus according to claim 1 wherein said transfer means includes an elongated shoe engageable with the top of the trays on said overhead conveyor means for disengaging the trays from said overhead conveyor means.

9. An apparatus according to claim 1 wherein said tray transfer means includes a magnetic pickup head mounted for movement between a lower position engaging a tray at the upper end of the stack and a raised position to transfer the top tray from the stack to the overhead conveyor means.

10. An apparatus according to claim 9 including means for sensing the presence or absence of a tray on the overhead conveyor means and for preventing operation of said transfer means until a tray on the overhead conveyor means has cleared a position above the elevator.

11. An apparatus according to claim 9 including stack conveyor means adjacent the lower end of said elevator means for advancing a stack of articles to the elevator means, means for sensing depletion of the stack on the elevator means to a preselected minimum for operating said stack conveyor means to advance a succeeding stack of trays to the elevator means, and means operative when the stack of articles on the elevator means is exhausted for driving the elevator means to pick up said succeeding stack of trays.

12. An apparatus according to claim 11 including means for sensing the presence or absence of a tray on said overhead conveyor means, and means for preventing operation of said tray transfer means when a tray is on the overhead conveyor means above the elevator means.

13. An apparatus according to claim 10 including means for sensing a back-up of trays on the outlet conveyor means, and means operated by said last-mentioned sensing means for stopping the overhead conveyor means.

14. A tray stacking apparatus for use in a recirculating loop baking tray conveyor system for stacking baking trays and the like of ferromagnetic material comprising:

said recirculating loop baking tray conveyor system including inlet and outlet tray conveyor sections each adapted to underlie and support trays at a selected level adjacent a stacking station and having adjacent ends spaced apart a distance substantially greater than the length of a tray, elevator means at said stacking station for supporting an upright stack of trays, said stack elevator means including laterally spaced endless chains extending vertically downwardly from adjacent said preselected level at relatively opposite sides of the path of travel of the trays on the overhead conveyor means, said laterally spaced chains having stack supports at spaced locations therealong adapted to underlie and support the lowermost tray in a stack disposed between the chains, means for sensing the level of the top of the stack of trays between said chains, and elevator drive means responsive to said stack level sensing means for driving said chains in a direction to lower the stack until the top tray in the stack is at a level slightly below said selected level, said baking tray conveyor system including an endless type overhead conveyor means having a lower run spaced above said selected level a distance approximating the height of a tray and extending from said one end of the inlet tray conveyor section over said elevator means to said outlet tray conveyor section, magnetic means cooperable with said lower run of said overhead conveyor means for magnetically holding the top of a ferromagnetic tray against the lower run for advance therewith, means mounting said overhead conveyor means for vertical adjustment relative to said inlet and outlet conveyor sections and to said stack elevator means to position the overhead conveyor means at a level above said selected level of said inlet and outlet tray conveyor sections a distance corresponding to the height of the baking trays to allow the trays to move from the inlet conveyor section along the lower run of the overhead conveyor and onto the outlet conveyor section for recirculating the trays, a tray stop mounted for movement between an operative position in the path of movement of the trays on said overhead conveyor and an inoperative position out of the path of movement of the trays on the overhead conveyor, said stop means in said operative position thereof being arranged to stop trays on the overhead conveyor above said elevator means, and tray ejector means, and means operable when a tray is advanced on the lower run of said overhead conveyor means to a position over a stack on said elevator means and against said tray stop for operating said tray ejector means to discharge the tray from the overhead conveyor means onto the stack.

15. A tray stacking apparatus according to claim 14 wherein said tray ejector means includes an elongated shoe engageable with the top of a tray on said overhead conveyor means along at least a major portion of the length of the tray, and means for vertically moving said shoe to eject a tray from the lower run of said overhead conveyor means.

16. A tray stacking apparatus according to claim 14 including means responsive to a back-up of trays on the outlet tray conveyor means for moving said stop means to its operative position.

17. A tray unstacking apparatus for use in a recirculating loop baking tray conveyor system for unstacking baking trays and the like of ferromagnetic material comprising:

said recirculating loop baking tray conveyor system including inlet and outlet tray conveyor sections adapted to underlie and support the trays at a selected level adjacent an unstacking station and having adjacent ends spaced apart a distance greater than the length of a tray, elevator means at said stacking station for supporting an upright stack of trays, said stack elevator means including laterally spaced endless chains extending vertically downwardly from adjacent said preselected level at relatively opposite sides of the path of travel of the trays on the overhead conveyor means, said laterally spaced chains having stack supports at spaced locations therealong adapted to underlie and support the lowermost tray in a stack disposed between the chains, means for sensing the level of the top of the stack of trays between said chains, and elevator drive means responsive to said stack level sensing means for driving said chains to raise the stack until the top tray in the stack is at a level slightly below said selected level, said baking tray conveyor system including an endless type overhead conveyor means having a lower run overlying said elevator means and extending from said inlet conveyor section to said outlet tray conveyor section and spaced thereabove a distance approximating the height of a tray, magnetic means cooperable with said lower run of said overhead conveyor means for magnetically holding the top of a ferromagnetic tray against the lower run for advance therewith, means mounting said overhead conveyor means for vertical adjustment relative to said inlet and outlet conveyor sections and to said stack elevator means to position the overhead conveyor means at a level above said selected level of said inlet and outlet tray conveyor sections a distance corresponding to the height of the baking trays to allow the trays to move from the inlet conveyor section along the lower run of the overhead conveyor and onto the outlet conveyor section for recirculating the trays, tray transfer means including a magnetic pickup head mounted for movement between a lower position engaging the top tray in the stack and a raised position adjacent said lower run of the overhead conveyor means to transfer a tray from the stack to the overhead conveyor means, tray sensing means for sensing the presence of a tray on said overhead conveyor means in a zone between a location substantially in advance of the elevator means to a location beyond the outlet side of said elevator means, drive means operable to drive said pickup head from said raised position to said lower position and back, and means responsive to said tray sensing means for controlling said drive means to prevent operation of said tray transfer means when a tray is in said zone.

18. A tray unstacking apparatus according to claim 17 including means for sensing a back-up of trays on said outlet tray conveyor section, and means responsive to said last-mentioned means for stopping said overhead conveyor means.

19. A tray unstacking apparatus according to claim 17 including, stack conveyor means operable to advance a stack into position between said laterally spaced endless chains of said elevator means, means responsive to depletion of the stack on the stack supports to a preselected minimum for operating said stack conveyor means to advance a stack to said elevator means, and means operative when the stack on the elevator means is exhausted for operating the elevator means to pick up a succeeding stack from the stack conveyor means.

* * * * *